(12) United States Patent
Yukawa et al.

(10) Patent No.: US 11,981,210 B2
(45) Date of Patent: May 14, 2024

(54) CONTROLLER AND CONTROL METHOD FOR HYBRID VEHICLE

(71) Applicants: Bosch Corporation, Tokyo (JP); Robert Bosch GmbH, Stuttgart (DE)

(72) Inventors: Masashi Yukawa, Kanagawa (JP); Bryan Mani, Noord-Brabant (NL); Michael Just, Kanagawa (JP)

(73) Assignees: Bosch Corporation, Tokyo (JP); Robert Bosch GmbH, Stuttgart (DE)

( * ) Notice: Subject to any disclaimer, the term of this patent is extended or adjusted under 35 U.S.C. 154(b) by 655 days.

(21) Appl. No.: 17/262,868

(22) PCT Filed: Jun. 26, 2019

(86) PCT No.: PCT/JP2019/025261
§ 371 (c)(1),
(2) Date: Jan. 25, 2021

(87) PCT Pub. No.: WO2020/021941
PCT Pub. Date: Jan. 30, 2020

(65) Prior Publication Data
US 2021/0237552 A1    Aug. 5, 2021

(30) Foreign Application Priority Data
Jul. 24, 2018 (JP) .................. 2018-138101

(51) Int. Cl.
*B60K 6/543* (2007.10)
*B60K 6/48* (2007.10)
(Continued)

(52) U.S. Cl.
CPC ............... *B60K 6/543* (2013.01); *B60K 6/48* (2013.01); *B60L 50/16* (2019.02); *B60W 10/08* (2013.01); *B60W 20/30* (2013.01)

(58) Field of Classification Search
CPC .......... B60K 6/543; B60K 6/48; B60K 6/387; B60K 2006/4808; B60L 50/16;
(Continued)

(56) References Cited

U.S. PATENT DOCUMENTS 7,890,237 B2 * 2/2011 Kuwahara ............ F16H 61/143
477/169
2015/0051767 A1 * 2/2015 Mohri ..................... B60L 50/66
180/65.265
(Continued)

FOREIGN PATENT DOCUMENTS

| JP | 2000236601 A | 8/2000 |
|---|---|---|
| JP | 2002171604 A | 6/2002 |

(Continued)

OTHER PUBLICATIONS

English machgne-translation via Microsoft Word of JP 2010158937 A, information obtained from https://www.j-platpat.inpit.go.jp/c1800/PU/JP-2010-158937/7CE0E740B238CE979A1245B569B51AD9AB758C9CD429D71A5A9ABCF9115C5676/11/en on Sep. 15, 2023. (Year: 2023).*

(Continued)

*Primary Examiner* — Calvin Cheung
(74) *Attorney, Agent, or Firm* — Michael Best & Friedrich LLP (57) ABSTRACT

A controller for a hybrid vehicle capable of making a first control rule and a second control rule cooperate with each other is provided. In the first control rule, a gear ratio is controlled such that output from an internal combustion engine via a transmission satisfies requested drive power. In the second control rule, the gear ratio is controlled such that a sum of drive power by a motor and drive power by the internal combustion engine becomes the requested drive power. A device (30) for controlling a hybrid vehicle that includes an internal combustion engine (11) and a motor (Continued)

(13) as power sources capable of generating drive power for a wheel (18) and is provided with a transmission (12), a gear ratio of which is controlled according to the first control rule, between the internal combustion engine (11) and the wheel (18), calculates a target gear ratio according to the second control rule and determines a parameter (vAp) used in the first control rule on the basis of the target gear ratio such that a sum of drive power (Fm) by the motor (13) and drive power (Fe) by the internal combustion engine (11) becomes requested drive power (Fd).

7 Claims, 4 Drawing Sheets

(51) Int. Cl.
*B60L 50/16* (2019.01)
*B60W 10/08* (2006.01)
*B60W 20/30* (2016.01)

(58) Field of Classification Search
CPC .......... B60L 2240/486; B60L 15/2054; B60W 10/08; B60W 20/30; B60W 2520/10; B60W 2540/10; B60W 2710/086; B60W 10/101; B60W 20/11; B60W 30/1882; B60W 2710/0677; B60W 2710/1005; B60W 10/06; B60W 10/10; Y02T 10/40; Y02T 10/62; Y02T 10/64; Y02T 10/72; Y02T 10/7072; Y02T 10/84
See application file for complete search history.

(56) References Cited

U.S. PATENT DOCUMENTS

| | | |
|---|---|---|
| 2015/0367840 A1 | 12/2015 | Yang |
| 2019/0061738 A1* | 2/2019 | Goto ................... F16H 61/0204 |
| 2021/0237552 A1* | 8/2021 | Yukawa ................ B60W 10/08 |

FOREIGN PATENT DOCUMENTS

| | | | |
|---|---|---|---|
| JP | 3842467 B2 | 11/2006 | |
| JP | 2010158937 A | 7/2010 | |
| WO | 2013077161 A1 | 5/2013 | |
| WO | WO-2016177392 A1 * | 11/2016 | ............ B60W 10/10 |

OTHER PUBLICATIONS

Translation of the International Search Report for Application No. PCT/JP2019/025261 dated Sep. 3, 2019 (2 pages).

* cited by examiner

CONTROLLER AND CONTROL METHOD FOR HYBRID VEHICLE

BACKGROUND OF THE INVENTION

The present invention relates to a controller for a hybrid vehicle.

Conventionally, a hybrid vehicle that includes an internal combustion engine and a motor as power sources capable of generating drive power for wheels and that is provided with a transmission between the internal combustion engine and the wheels has been known (for example, see JP-A-2000-166019). In the vehicle provided with the transmission between the internal combustion engine and the wheels, just as described, even in the case where the drive power and a speed of the wheels that are requested by a driver are generated, a gear ratio of the transmission possibly varies within a specified range. For this reason, an operation state of the internal combustion engine has a variation width to some extent. Accordingly, by controlling the gear ratio, the operation state of the internal combustion engine can be an appropriate state for a certain purpose.

SUMMARY OF THE INVENTION

Here, a control rule that brings the operation state of the internal combustion engine into the appropriate state for the certain purpose and controls the gear ratio such that output from the internal combustion engine via the transmission satisfies the requested drive power will be referred to as a first control rule. In addition, a control rule that brings the operation state of the internal combustion engine into the appropriate state for the certain purpose and controls the gear ratio such that a sum of the drive power by the motor and the drive power by the internal combustion engine corresponds to the requested drive power will be referred to as a second control rule. In the case where the motor can generate electricity, the drive power generated by the motor includes a negative value during generation of the electricity. The operation state of the internal combustion engine that corresponds to the gear ratio acquired by the first control rule will be set as a first state, and the operation state of the internal combustion engine that corresponds to the gear ratio acquired by the second control rule will be set as a second state.

In the second control rule, the requested drive power is covered by not only the output of the internal combustion engine but also by the output of the motor. Thus, the second state possibly differs from the first state. For example, the second state cannot be achieved when the gear ratio is only controlled according to the first control rule. That is, it is requested to make the first control rule and the second control rule cooperate with each other in the hybrid vehicle.

The present invention has been made in view of the above problem and therefore provides a controller for a hybrid vehicle capable of making a first control rule and a second control rule cooperate with each other.

Solution to Problem

According to an aspect of the present invention, a device for controlling a hybrid vehicle that includes an internal combustion engine and a motor as power sources capable of generating drive power for a wheel and is provided with a transmission, a gear ratio of which is controlled according to a first control rule, between the internal combustion engine and the wheel is provided. The controller for the hybrid vehicle is configured to calculate a target gear ratio according to a second control rule and determine a parameter used in the first control rule on the basis of the target gear ratio such that a sum of drive power by the motor and drive power by the internal combustion engine becomes requested drive power.

Advantageous Effects of Invention

As it has been described so far, according to the present invention, it is possible to make the first control rule and the second control rule cooperate with each other.

DETAILED DESCRIPTION

A detailed description will hereinafter be made on a preferred embodiment of the present invention with reference to the accompanying drawings. In the present specification and the drawings, components that have substantially the same functional configuration will be denoted by the same reference sign, and thus a description thereon will not be repeated.

<1. Configuration Example of Hybrid Vehicle>

Figure 1:
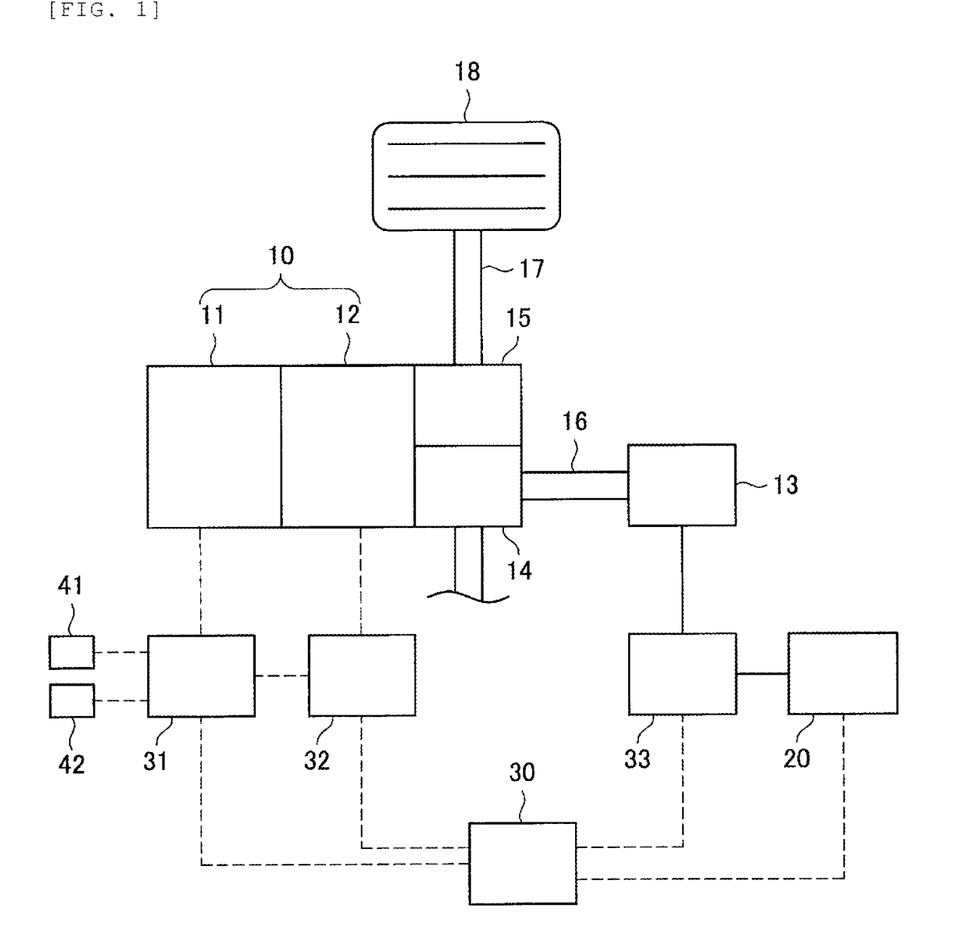
FIG. 1 is a schematic view illustrating a configuration example of a hybrid vehicle in an embodiment of the present invention.

A description will firstly be made on a configuration example of a hybrid vehicle, to which a controller in this embodiment is applied, with reference to FIG. 1. A drive system in the hybrid vehicle includes an engine 11, an automatic transmission 12, a motor 13, a transfer case 14, and a differential mechanism 15. A power supply system in the hybrid vehicle has a battery 20 as a secondary battery.

The engine 11 is an internal combustion engine that uses gasoline, diesel fuel, or the like as fuel. When power that is generated by the engine 11 is transmitted to a wheel 18, drive power for the wheel 18 can be generated. The wheel 18 is a front wheel, for example, and functions as a drive wheel.

The automatic transmission 12 is provided in a power transmission path between the engine 11 and the wheel 18, changes a speed of output rotation from the engine 11, and transmits the output rotation to an axle 17 side. The engine 11 and the automatic transmission 12 function as a vehicle drive unit 10. The automatic transmission 12 is a continuously variable transmission system and has, for example, a continuously variable transmission (CVT) and a forward/reverse switching mechanism.

The CVT is of a belt type and has: a primary pulley that is coupled to an input shaft (a shaft on an output side of the engine 11) of the CVT; a secondary pulley that is coupled to an output shaft of the CVT; and a belt that is wound around both of the pulleys. The belt functions as a power transmission member that transmits torque between the pulleys.

For example, when a groove width of each of the pulleys varies by a hydraulic pressure, and a wound radius of the belt varies consequently, rotation that is transmitted from the input shaft to the output shaft of the CVT can vary continuously. The output shaft of the CVT is coupled to the wheel 18 via a reduction gear, the differential mechanism 15, and the axle 17.

The forward/reverse switching mechanism is provided in the power transmission path between the engine 11 and the CVT, and includes a planetary gear, a forward clutch, and a reverse brake, for example. By controlling the forward clutch and the reverse brake, a rotational direction of the input shaft of the CVT, that is, forward travel and reverse travel of the vehicle can be switched. When both of the forward clutch and the reverse brake are disengaged, torque transmission between the engine 11 and the CVT is cut off.

The motor 13 is a three-phase AC rotary electric machine, for example, and is connected to the battery 20 via an inverter. An output shaft 16 of the motor 13 is coupled to the wheel 18 via the reduction gear, the differential mechanism 15, and the axle 17.

During motoring, the motor 13 functions as a motor (a drive motor) that generates power by using electricity of the battery 20 and generates drive power for driving the wheel 18. During regeneration, the motor 13 functions as a motor (a generator) that is driven by the power transmitted from the wheel 18 side in conjunction with deceleration of the vehicle and generates the electricity.

The transfer case 14 is provided between a shaft on the output side of the automatic transmission 12 (the output shaft of the CVT) and the output shaft 16 of the motor 13, and has a transfer gear and a transfer clutch. The transfer gear may be integrated with a gear of the differential mechanism 15.

The transfer clutch is a friction element that is engaged or disengaged by the hydraulic pressure, for example, and may be provided between the output shaft 16 of the motor 13 and the differential mechanism 15. The transfer case 14 can switch between allowance and prohibition of the torque transmission between the motor 13 and the axle 17 by changing an engaged state of the transfer clutch.

In a state where the transfer clutch is engaged, in addition to the power output from the engine 11, the power output from the motor 13 is transmitted to the wheel 18, and a hybrid travel mode in which the vehicle can be driven by both of the engine 11 and the motor 13 is achieved. In the hybrid travel mode, the motor 13 can also be driven to generate the electricity by using the power that is transmitted from the engine 11 side. For example, in a case where the output of the engine 11 has a surplus, the motor 13 functions as the generator by using some of the power of the engine 11. In this way, energy efficiency of the engine 11 can be improved.

In a state where the transfer clutch is disengaged, only the power output from the engine 11 is transmitted to the wheel 18, and an engine travel mode in which the vehicle can be driven by the engine 11 is achieved.

The transfer clutch may be provided between the shaft on the output side of the automatic transmission 12 (the output shaft of the CVT) and the differential mechanism 15.

<2. Configuration Example of Controller>

As illustrated in FIG. 1, a control system in the hybrid vehicle according to this embodiment has an engine control unit (ECU) 31, a transmission control unit (TCU) 32, a motor control unit (MCU) 33, and a hybrid control unit (HCU) 30.

For example, each of the control units 30 to 33 may partially or entirely be constructed of a microcomputer, a microprocessor unit, or the like. The microcomputer or the like may include: a central processing unit (CPU) that executes various types of arithmetic processing; read only memory (ROM) that stores various control programs; random access memory (RAM) that is used as a work area to store data and execute programs; and input/output interfaces (I/O), and may have a general configuration in which these components are mutually connected by a bidirectional common bus. In addition, each of the control units may partially or entirely be constructed of a member in which firmware or the like can be updated, or may partially or entirely be a program module or the like that is executed by a command from the CPU or the like.

The ECU 31 is connected to various actuators and sensors provided to the engine 11, an accelerator pedal position sensor 41, and a vehicle speed sensor 42 via a communication line. The accelerator pedal position sensor 41 detects an accelerator pedal position Ap as an operation amount of an accelerator pedal. The vehicle speed sensor 42 detects a rotational frequency of the axle 17 or the wheel 18, for example. The ECU 31 detects a speed of the vehicle (hereinafter a vehicle speed V) on the basis of a signal from the vehicle speed sensor 42.

The ECU 31 is also connected to the TCU 32 and the HCU in a manner to allow bidirectional communication via the communication line such as a controller area network (CAN), and bidirectionally communicates various types of information that pertain to control information and a control target. The ECU 31 adjusts a throttle valve opening degree, ignition timing, a fuel injection amount, and the like on the basis of signals received from the sensors, the TCU 32, and the HCU 30, and can thereby control an operation state of the engine 11.

The TCU 32 is connected to the automatic transmission 12 via a communication line. The TCU 32 is also connected to the HCU in a manner to allow bidirectional communication via a communication line such as the CAN.

The TCU 32 controls an oil pump, each control valve and the clutches provided to the automatic transmission 12, and the clutch of the transfer case 14 on the basis of signals received from the sensors that detect states of the automatic transmission 12 and the transfer case 14, the ECU 31, and the HCU 30. In this way, the TCU 32 can control actuation states of the automatic transmission 12 and the transfer case 14.

For example, by controlling the hydraulic pressure, the TCU 32 controls the engagement/disengagement of the transfer clutch, that is, switching of the travel mode.

Figure 2:
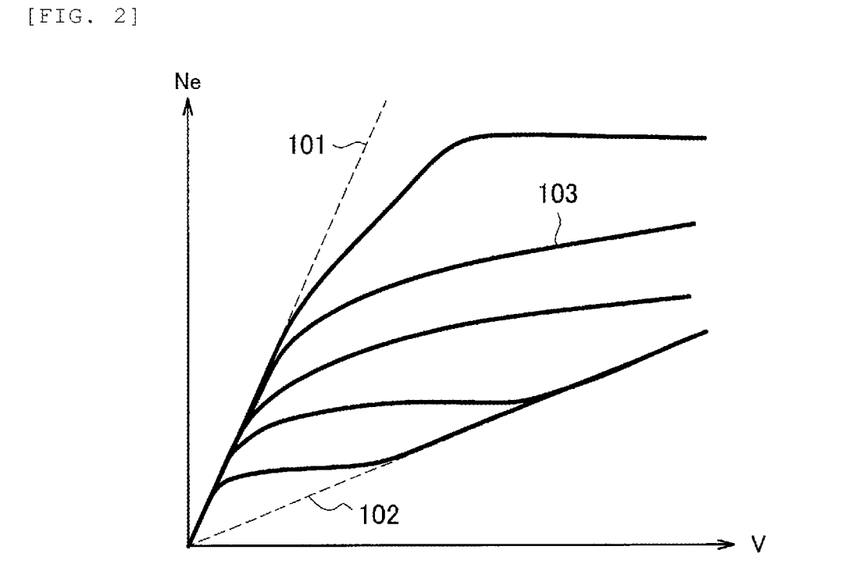
FIG. 2 illustrates an example of a gear-shift graph that is used by a transmission control unit in the embodiment.

In addition, the TCU 32 functions as a gear-shift controller that controls a gear ratio of the automatic transmission 12 by controlling the hydraulic pressure. The TCU 32 refers to a specified gear-shift graph (map) as illustrated in FIG. 2, for example, to determine a target pulley ratio of the CVT. In FIG. 2, the vehicle speed V corresponds to a rotational frequency of the output shaft of the CVT, and an engine speed Ne corresponds to a rotational frequency of the input shaft of the CVT. Thus, a ratio of the engine speed Ne to the vehicle speed V corresponds to a pulley ratio R.

The pulley ratio R can vary between the lowest line 101 and the highest line 102 that are indicated by broken lines in FIG. 2. Plural gear-shift lines 103 are defined such that, as the accelerator pedal position Ap is increased, the engine speed Ne is increased, in other words, the pulley ratio R moves to a lower side.

Figure 3:
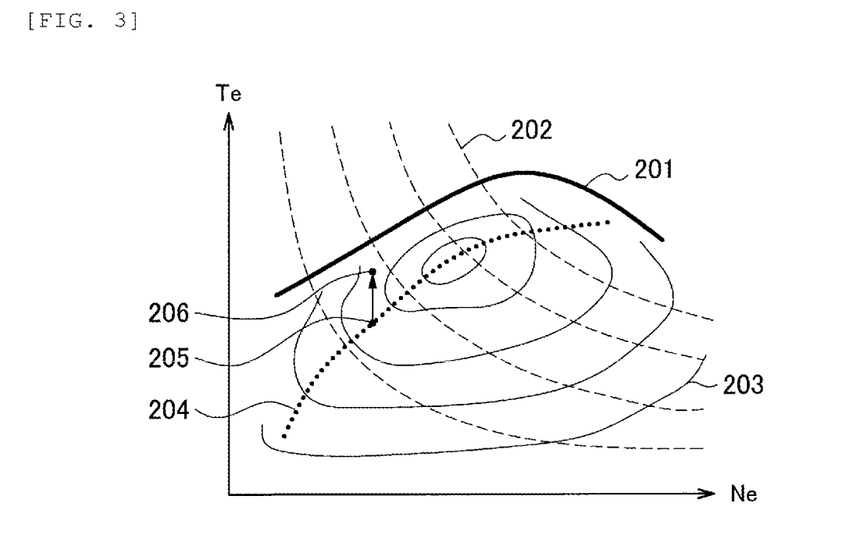
FIG. 3 illustrates an example of a characteristic that an internal combustion engine in the embodiment has.

FIG. 3 illustrates an example of a characteristic of the engine 11. Maximum torque 201 of the engine 11, an equal output line 202, and an equal fuel consumption line 203 are respectively indicated by a bold solid line, a thin broken line, and a thin solid line. A point at which the equal fuel consumption line 203 and the equal output line 202 meet indicates the operation state of the engine 11 where fuel consumption is optimum, and a dotted line drawn by connecting these points is an optimum fuel consumption line 204. In the case where the engine 11 is operated on this optimum fuel consumption line 204, a fuel consumption amount by the engine 11 can be minimized. In the gear-shift graph illustrated in FIG. 2, the plural gear-shift lines 103 are defined such that the operation state of the engine 11 is located on the optimum fuel consumption line 204.

The MCU 33 has the inverter and a motor controller. The inverter converts DC power supplied from the battery 20 into AC power, supplies the AC power to the motor 13, and thereby drives the motor 13. The inverter converts the AC power supplied from the motor 13 into the DC power, supplies the DC power to the battery 20, and thereby charges the battery 20.

The motor controller is connected to the inverter and the motor 13 via a communication line. The motor controller is also connected to the HCU 30 in a manner to allow bidirectional communication via a communication line such as the CAN. The motor controller outputs a command signal to the inverter on the basis of signals received from various sensors provided to the motor 13 and the HCU 30, and controls an actuation state of the motor 13.

The HCU 30 functions as a controller for the hybrid vehicle by generating requested drive power for the vehicle and controlling the drive system and the power supply system in an integrated manner so as to achieve the optimum operation state from a perspective of the energy efficiency of the entire vehicle.

The HCU 30 is connected to the other control units 31, 32, 33 and is also connected to the battery 20 via a communication line. The HCU 30 receives information on a state of charge (SOC), a temperature, a voltage, a current, and the like from the battery 20. In order to suppress overcharging and over-discharging of the battery 20 while improving the energy efficiency, the HCU 30 outputs a command signal to the MCU 33 to control the actuation state of the motor 13. In this way, the HCU 30 controls the SOC such that the SOC fluctuates within a specified range.

In addition, the HCU 30 executes arithmetic processing on the basis of the information from the battery 20, information on the vehicle speed V, the accelerator pedal position Ap, and the like received from the ECU 31, and information from the TCU 32, and outputs a signal to the ECU 31 and the TCU 32. In this way, the HCU 30 can control the operation state of the engine 11 and the actuation state of the automatic transmission 12.

(Flowchart)

Figure 4:
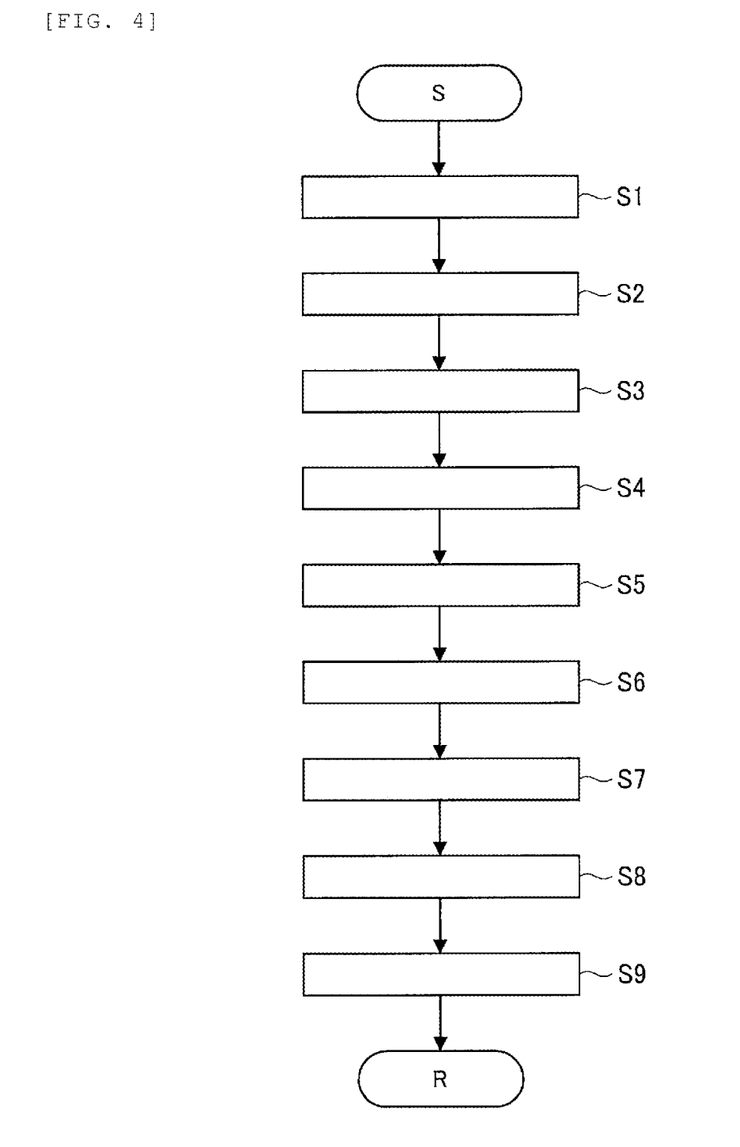
FIG. 4 is a flowchart illustrating control processing that is executed by a hybrid control unit in the embodiment.

FIG. 4 illustrates a processing procedure that is executed by the HCU 30 in this embodiment. This processing is repeatedly executed in specified cycles at least during the hybrid travel mode.

In step S1, the HCU 30 reads various types of the information. More specifically, the HCU 30 reads the information on the engine 11, the vehicle speed V, and the accelerator pedal position Ap from the ECU 31. The HCU 30 reads the information on the CVT from the TCU 32. The HCU 30 reads, as the information on the motor 13, the temperature, the current, the voltage, the rotational frequency, and the like from the MCU 33. The HCU 30 reads, as the information on the battery 20, the SOC, the temperature, the voltage, and the like from the battery 20.

In step S2, the HCU 30 calculates requested drive power Fd on the basis of the vehicle speed V and the accelerator pedal position Ap with reference to a specified map, for example.

In step S3, the HCU 30 samples plural possible engine states, each of which is a state into which the engine 11 can be brought, in the current operation state of the vehicle. Each of the possible engine states is denoted by an index i. The index i is a natural number from 1 to n1, for example.

For example, the HCU 30 calculates a possible gear-shift range of the CVT, in other words, a variable range of the pulley ratio R on the basis of the information on the CVT. In the case where this range is equally divided into n1 portions, it is possible to identify a pulley ratio R(i) that can be achieved at any i. An engine speed Ne(i) can be identified on the basis of this pulley ratio R(i) and the vehicle speed V. The speed Ne(i) corresponds to the possible engine state i.

In step S4, the HCU 30 samples plural possible motor states, each of which is a state into which the motor 13 can be brought, in the current operation state of the vehicle. Each of the possible motor states is denoted by an index j. The index j is a natural number from 1 to n2, for example.

For example, based on the information on the battery 20 and the motor 13, the HCU 30 calculates a possible range of drive power Fm of the vehicle by the motor 13, in other words, a range of the drive power Fm by the power that can be output by the motor 13. In the case where this range is equally divided into n2 portions, it is possible to identify drive power Fm(j) that can be generated by the motor 13 at any j. Motor torque Tm(j) can be calculated by using a tire diameter of the wheel 18, a gear ratio between the motor 13 and the axle 17, and the drive power Fm(j). The torque Tm(j) corresponds to the possible motor state j.

Here, each of the drive power Fm and the torque Tm can have a positive value during discharging of the battery 20, that is, during motoring of the motor 13 and can also have a negative value during charging of the battery 20, that is, during regeneration of the motor 13.

In step S5, the HCU 30 calculates engine torque Te(i, j) in the possible engine state i and the possible motor state j.

For example, the HCU 30 calculates drive power Fe(j) of the vehicle by the engine 11 in the possible motor state j by subtracting the drive power Fm(j), which is calculated in step S4, from the requested drive power Fd calculated in step S2. A gear ratio between the engine 11 and the axle 17 in the possible engine state i is calculated by using the engine speed Ne(i), which is calculated in step S3, and the vehicle speed V. This gear ratio includes the pulley ratio R of the CVT. The engine torque Te (i, j) can be calculated by using this gear ratio, the tire diameter of the wheel 18, and the drive power Fe(j).

Here, maximum torque and minimum torque that can be output by the engine 11 may be identified on the basis of the information on the engine 11, and the above-calculated engine torque Te(i, j) may be restricted so as not to exceed the maximum torque or fall below the minimum torque.

In step S6, the HCU 30 calculates consumed energy Qe(i, j) by the engine 11 in the possible engine state i and the possible motor state j.

For example, the HCU 30 calculates the fuel consumption amount per unit time of the engine 11 in the possible engine state i and the possible motor state j from the engine speed Ne(i) and the engine torque Te(i, j) on the basis of the information on the engine 11. By converting this into energy [kW], the consumed energy Qe(i, j) can be calculated.

In step S7, the HCU 30 calculates consumed energy Qm(j) of the motor 13 in the possible motor state j.

For example, the HCU 30 calculates the output of the motor 13 in the possible motor state j from the motor torque Tm(j) and a motor rotational frequency Nm with reference to a specified motor efficiency map based on specifications of the motor 13. In addition, the HCU 30 calculates a coefficient F from the SOC of the battery 20 with reference to the motor efficiency map. The coefficient F is a coefficient that is used to convert the output of the motor 13 as electrical energy into fuel consumption energy, that is, a heat generation amount. The consumed energy Qm(j) can be calculated by multiplying the output of the motor 13 in the possible motor state j by the coefficient F.

In step S8, of combinations (i, j) of the possible engine state i and the possible motor state j, the HCU 30 identifies, as an optimum state (I, J), the combination with which a sum of the consumed energy Qe(i, j) and the consumed energy Qm(j) is the lowest.

In step S9, the HCU 30 outputs a command signal for realizing the optimum state (I, J) to the ECU 31, the TCU 32, and the MCU 33. More specifically, the HCU 30 sends, to the ECU 31, such a command signal that torque Te(I, J) of the engine 11 in the state (I, J) is set to target engine torque. The HCU 30 sends, to the MCU 33, such a command signal that torque Tm(J) of the motor 13 in a state J is set to target motor torque. Furthermore, the HCU 30 calculates an imaginary accelerator pedal position vAp and sends the imaginary accelerator pedal position vAp to the TCU 32.

Instead of the torque Te (I, J), the HCU 30 may send, as the command signal, the accelerator pedal position Ap corresponding to the torque Te (I, J) to the ECU 31.

An order of the above steps can appropriately be changed. For example, steps S2 to S4 may appropriately be switched.

Figure 5:
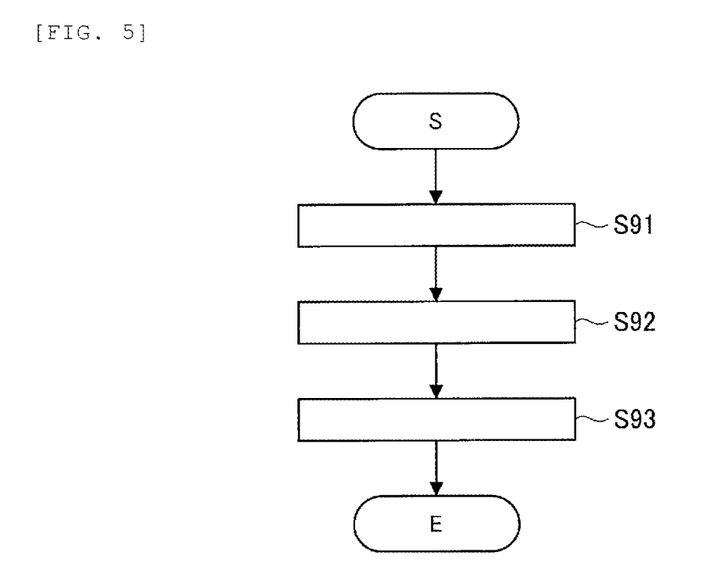
FIG. 5 is a flowchart illustrating calculation processing of an imaginary accelerator pedal position that is executed by the hybrid control unit in the embodiment.

FIG. 5 illustrates a processing procedure for calculating the imaginary accelerator pedal position vAp by the HCU 30 in step S9.

In step S91, the HCU 30 calculates drive power Fm(j) of the motor 13 in the optimum motor state J from the tire diameter of the wheel 18, the gear ratio between the motor 13 and the axle 17, and the motor torque Tm(J).

In step S92, the HCU 30 calculates drive power Fe(J) of the vehicle by the engine 11 in the optimum motor state J by subtracting the drive power Fm(J), which is calculated in step S91, from the requested drive power Fd. A value that is acquired by converting this drive power Fe(J) into the torque by the tire diameter of the wheel 18 is divided by the target engine torque Te (I, J). Then, based on the result, target pulley ratio R(I, J) of the CVT is calculated.

The method for calculating the target pulley ratio R(I, J) is not limited thereto. For example, the rotational frequency of the output shaft of the CVT may be calculated from the vehicle speed V and the gear ratio between the CVT and the wheel 18, a speed Ne (I) of the engine 11 in the optimum state I may be divided by the rotational frequency of the output shaft, and, based on the result, the target pulley ratio R(I, J) may be calculated.

In step S93, the HCU 30 calculates the imaginary accelerator pedal position vAp on the basis of the target pulley ratio R(I, J) and the vehicle speed V with reference to the map in FIG. 2 that is the same as the map used by the TCU 32.

<3. Operation Example of Controller>

As described above, for example, the TCU 32 uses the map as illustrated in FIG. 2 to controls the gear ratio of the automatic transmission 12, more specifically, the pulley ratio R of the CVT such that the operation state of the engine 11 is located on the optimum fuel consumption line 204. The TCU 32 may use a calculation formula or the like instead of the map. A control rule of such a gear ratio will hereinafter be referred to as a first control rule.

In the first control rule, the accelerator pedal position Ap and the vehicle speed V are used as parameters, for example, and the gear ratio is controlled on the basis of these parameters. Since the automatic transmission 12 is the continuously variable transmission system, the gear ratio to be controlled can vary continuously.

For example, by executing the processing as illustrated in FIG. 4 and FIG. 5, the HCU 30 calculates the target pulley ratio R(I, J) as a target gear ratio such that a sum of the drive power Fm by the motor 13 and drive power Fe by the engine 11 becomes the requested drive power Fd and that a sum of consumed energy Qe of the engine 11 and consumed energy Qm of the motor 13 becomes the lowest. A gear ratio control rule that includes such a calculation rule of the target gear ratio will hereinafter be referred to as a second control rule.

In the second control rule, the torque Te(i, j) and the speed Ne (i) in the plural operation states, each of which is a state into which the engine 11 can currently be brought, are calculated according to the plural gear ratios, each of which can currently be achieved by the automatic transmission 12 (steps S3 to S5 in FIG. 4). Of these plural operation states (the torque Te (i, j), the speed Ne(i)), the torque Te (I, J) and the speed Ne (I) in the operation state where the sum of the consumed energy Qe, Qm is the lowest are selected (steps S6 to S8). Based on the thus-selected operation state (the torque Te(I, J) or the speed Ne(I)), the target pulley ratio R(I, J) as the target gear ratio is calculated (step S9, steps S91, S92 in FIG. 5).

The HCU 30 calculates the imaginary accelerator pedal position vAp on the basis of the target pulley ratio R(I, J) and the vehicle speed V by using the map as illustrated in FIG. 2, for example (step S93 in FIG. 5). This corresponds to a back calculation of the accelerator pedal position Ap by using the first control rule. The HCU 30 may use a calculation formula or the like instead of the map. The HCU 30 outputs the determined imaginary accelerator pedal position vAp to the TCU 32 (step S9 in FIG. 4).

The TCU 32 controls the gear ratio according to the first control rule by using the imaginary accelerator pedal position vAp received from the HCU 30. The TCU 32 uses the map as illustrated in FIG. 2, for example, to set the gear ratio on the basis of the imaginary accelerator pedal position vAp and the vehicle speed V received from the ECU 31 or the like, and controls the CVT to achieve such a gear ratio. The TCU 32 may use a calculation formula or the like instead of the map.

The parameter, such as the accelerator pedal position Ap or the vehicle speed V, that is used in the first control rule or the second control rule may be an estimation value acquired by a calculation or the like, may be a command value instead of the detection value by the sensor.

<4. Significance of Each Technical Idea Grasped from this Embodiment>

In general, in the vehicle provided with the transmission between the internal combustion engine and the wheels, even in the case where the requested drive power in the wheel and the rotational frequency of the wheel are generated, the gear ratio of the transmission possibly varies within the specified range. For this reason, the operation state of the engine has the variation width to some extent. Accordingly, by controlling the gear ratio, the operation state of the engine can be the appropriate state for a certain purpose.

In the first control rule of this embodiment, only the engine 11 is assumed as the drive power source, and the gear ratio is controlled such that the output of the unit 10 including the engine 11 and the automatic transmission 12 satisfies the requested drive power Fd. The operation state of the engine 11 that corresponds to this gear ratio will hereinafter be referred to as a first state.

In the second control rule, the target gear ratio of the automatic transmission 12 is set such that a sum of the output of the unit 10 and the output of the motor 13 satisfies the requested drive power Fd. The operation state of the engine 11 that corresponds to this target gear ratio will hereinafter be referred to as a second state.

In the second control rule, the requested drive power Fd is generated not only by the output of the unit 10 but also by the output of the motor 13. Thus, the second state possibly differs from the first state, and both of the states possibly diverge from each other. For example, in the case where the engine 11 drives the motor 13 to generate the electricity and the sum of the consumed energy Qe, Qm consequently becomes the lowest, in FIG. 3, the torque Te(I, J) in the second state possibly acquires a value at a point 206, which differs from a value at a point 205 in the first state. That is, the second state cannot be achieved when the gear ratio is only controlled according to the first control rule. Thus, it is requested to make the first control rule and the second control rule cooperate with each other in the hybrid vehicle.

Meanwhile, the HCU 30 in this embodiment determines the accelerator pedal position Ap (the imaginary accelerator pedal position vAp), which is the parameter used in the first control rule, on the basis of the target pulley ratio R(I, J) as the target gear ratio calculated according to the second control rule. In this way, the target gear ratio, which is calculated according to the second control rule, is incorporated into the first control rule. Thus, the above target gear ratio can be acquired even according to the first control rule, and the second state can be achieved. That is, in the hybrid vehicle, it is possible to make the first control rule and the second control rule cooperate with each other and to achieve the purpose of the second control rule while satisfying the requested drive power Fd.

In other words, the target pulley ratio R(I, J) as the target gear ratio is calculated on the basis of the drive power Fe, which is distributed to the unit 10, among the requested drive power Fd. Accordingly, the parameter (the imaginary accelerator pedal position vAp) that is determined on the basis of the target gear ratio includes the information on the output of the unit 10. Such information is used in the first control rule to control the gear ratio. In this way, it is possible to cancel divergence of the first state and the second state from each other.

The configuration of the drive system in the hybrid vehicle is not limited to that in this embodiment. For example, the motor may be provided between the engine and the transmission. That is, the above control in this embodiment can be applied to the hybrid vehicle in which the transmission is provided between the engine and the wheel and which can generate the drive power for the wheel by using both or one of the engine and the motor.

The drive system of this embodiment is configured that the power of the motor 13 is transmitted not to the engine 11 side of the automatic transmission 12 but to the opposite side of the engine 11, that is, the axle 17 side. Accordingly, the first control rule for the gear ratio, which is implemented by the TCU 32, is possibly based on such an assumption that the power of the motor 13 is not taken into consideration or the requested drive power Fd is only satisfied by the output of the unit 10. In such a case, the operational effect that is exerted as a result of the above control by the HCU 30 can effectively be obtained.

The second control rule may be a control rule for bringing the operation state of the engine 11 into a state suited for improvement in exhaust performance or the like. For example, the target pulley ratio R(I, J) as the target gear ratio may be calculated such that an exhaust amount of the engine 11 is minimized.

The second control rule in this embodiment is the control rule for bringing the operation state of the engine 11 into the state suited for the improvement in the energy efficiency of the engine 11 and the motor 13. For example, the HCU 30 calculates the target pulley ratio R(I, J) such that the sum of the consumed energy Qe, Qm becomes the lowest. In this way, the HCU 30 achieves the second state that is a state where the energy efficiency of the engine 11 and the motor 13 is higher than that in many other states. It is possible to improve the energy efficiency of the entire hybrid vehicle by reflecting such a perspective of the second control rule into the first control rule.

The first control rule may be a control rule that brings the operation state of the engine 11 into a state suited for improvement in travel performance (acceleration performance or the like) of the vehicle.

The first control rule in this embodiment is the control rule for bringing the operation state of the engine 11 into the state suited for the improvement in the energy efficiency. Thus, even during the travel using the drive power by the engine 11 only, it is possible to improve the energy efficiency of the hybrid vehicle.

In the second control rule, the torque Te(i, j) and the speed Ne(i) are calculated as the plural operation states, each of which is the state into which the engine 11 can currently be brought, according to the plural gear ratios, each of which can currently be achieved by the automatic transmission 12, and the target pulley ratio R(I, J) as the target gear ratio is calculated on the basis of the torque Te(I, J) or the speed Ne(I) as the one operation state selected therefrom. Just as described, in the second control rule, the target gear ratio is calculated on the basis of the plural gear ratios, each of which can currently be achieved by the automatic transmission 12. In this way, it is possible to further reliably achieve the second state at the gear ratio that is controlled on the basis of such a target gear ratio.

In the first control rule, the gear ratio is controlled on the basis of the accelerator pedal position Ap and the vehicle speed V. The accelerator pedal position Ap and the vehicle speed V correspond to the requested drive power Fd, and the vehicle speed V corresponds to the speed of the wheel 18. Thus, when the requested drive power Fd in the wheel 18 or the rotational frequency of the wheel 18 varies, the gear ratio that is controlled according to the first control rule possibly varies in accordance with such a variation. Even in such a case, in the second control rule, the target gear ratio is calculated on the basis of the plural gear ratios, each of which can currently be achieved by the automatic transmission 12. In this way, it is possible to achieve the second state.

The gear ratio of the automatic transmission 12 only needs to be controlled by any type of the control device. The automatic transmission 12 may be an automatic transmission of a multistage or a double-clutch type or may be an automated MT for which a manual transmission is automated, or the like.

The automatic transmission 12 in this embodiment is the continuously variable transmission system. Accordingly, even in the case where the gear ratio, which is controlled according to the first control rule, varies continuously, in the second control rule, the target gear ratio is calculated on the basis of the plural gear ratios, each of which can be achieved by the automatic transmission 12. In this way, it is possible to achieve the second state. In addition, by controlling the gear ratio finely in a continuous manner, the operation state of the engine 11 can be the further optimum state.

The TCU 32 may be a part of the HCU 30. In other words, the control unit that controls the gear ratio according to the first control rule may be a part of the controller for the hybrid vehicle.

The hybrid vehicle in this embodiment has the TCU 32 that controls the gear ratio according to the first control rule, and the HCU 30 outputs the determined parameter to the TCU 32. Accordingly, the TCU 32 that has conventionally been used in an engine-driven vehicle can be used for the control of the hybrid vehicle while remaining as a different component (a different body) from the HCU 30.

The above parameter may be the vehicle speed V or the like. For example, the HCU 30 may determine an imaginary vehicle speed vV as a parameter used in the first control rule on the basis of the target pulley ratio R(I, J) and the accelerator pedal position Ap. That is, in the case where the parameter, which is received by the TCU 32, is generally used in the normal engine-driven vehicle, in other words, is originally used by the TCU 32 in the first control rule, the TCU 32 can be used in the control of the hybrid vehicle without making a significant change to the original configuration of the TCU 32, that is, the calculation contents.

The above parameter in this embodiment is the accelerator pedal position Ap. For example, the HCU 30 determines the imaginary accelerator pedal position vAp as the parameter used in the first control rule on the basis of the target pulley ratio R(I, J) as the target gear ratio and the vehicle speed V. Thus, compared to the case where the vehicle speed V or the like is used as the parameter, it is possible to achieve the second state of the engine 11 with improved response by making the TCU 32 control the gear ratio.

The preferred embodiment of the present invention has been described in detail so far with reference to the accompanying drawings. However, the present invention is not limited to such an embodiment. It is obvious that a person who has basic knowledge in the technical field to which the present invention pertains could have easily arrived at various modification examples and application examples that fall within the scope of the technical idea described in the claims. It is understood that those naturally fall within the technical scope of the present invention.

REFERENCE SIGNS LIST

11: Internal combustion engine
12: Transmission
13: Motor
18: Wheel
30: Controller for hybrid vehicle

The invention claimed is:

1. A controller (30) for controlling a hybrid vehicle that includes an internal combustion engine (11) and a motor (13) as power sources capable of generating drive power for a wheel (18) and a transmission (12) between the internal combustion engine (11) and the wheel (18),
the controller (30) for the hybrid vehicle is configured to:
calculate a target gear ratio according to a second control rule;
determine a parameter (vAp) used in a first control rule based on the target gear ratio such that a sum of a drive power (Fm) by the motor (13) and a drive power (Fe) by the internal combustion engine (11) becomes a requested drive power (Fd); and
control a gear ratio of the transmission (12) according to the first control rule using the parameter (vAp).

2. The controller (30) for the hybrid vehicle according to claim 1, wherein in the second control rule, plural operation states, each of which is a state into which the internal combustion engine (11) can currently be brought, are calculated according to plural gear ratios, each of which can currently be achieved by the transmission (12), and the target gear ratio is calculated on the basis of one operation state selected from the plural operation states.

3. The controller (30) for the hybrid vehicle according to claim 1, wherein the second control rule is a control rule for bringing the operation state of the internal combustion engine (11) into a state suited for improvement in energy efficiency of the internal combustion engine (11) and the motor (13).

4. The controller (30) for the hybrid vehicle according to claim 1, wherein the controller (30) controls the gear ratio of the transmission (12) that is a continuously variable transmission system.

5. The controller (30) for the hybrid vehicle according to claim 1, wherein the hybrid vehicle has a gear-shift controller (32) that controls the gear ratio of the transmission (12) according to the first control rule, and
the controller (30) for the hybrid vehicle outputs the determined parameter (vAp) to the gear-shift controller (32).

6. The controller (30) for the hybrid vehicle according to claim 1, wherein the parameter is an operation amount of an accelerator pedal (vAp).

7. A method for controlling a hybrid vehicle that includes an internal combustion engine (11) and a motor (13) as power sources capable of generating drive power for a wheel (18) and a transmission (12) between the internal combustion engine (11) and the wheel (18), the method comprising:
calculating a target gear ratio according to a second control rule;
determining a parameter (vAp) used in a first control rule based on the target gear ratio such that a sum of a drive power (Fm) by the motor (13) and a drive power (Fe) by the internal combustion engine (11) becomes a requested drive power (Fd); and
controlling a gear ratio of the transmission (12) according to the first control rule using the parameter (vAp).

\* \* \* \* \*